United States Patent
Diaz et al.

(10) Patent No.: US 9,890,868 B2
(45) Date of Patent: Feb. 13, 2018

(54) AVIATION BYPASS VALVE INCLUDING A SHAPE MEMORY ALLOY MATERIAL

(71) Applicant: General Electric Company, Schenectady, NY (US)

(72) Inventors: Carlos Enrique Diaz, Garching bei Munchen (DE); William Dwight Gerstler, Niskayuna, NY (US); Michael Ralph Storage, Beavercreek, OH (US)

(73) Assignee: General Electric Company, Niskayuna, NY (US)

( * ) Notice: Subject to any disclaimer, the term of this patent is extended or adjusted under 35 U.S.C. 154(b) by 724 days.

(21) Appl. No.: 14/143,233

(22) Filed: Dec. 30, 2013

(65) Prior Publication Data

US 2015/0083367 A1 Mar. 26, 2015

Related U.S. Application Data (60) Provisional application No. 61/880,344, filed on Sep. 20, 2013.

(51) Int. Cl.
*F16K 31/00* (2006.01)
*F03G 7/06* (2006.01)
(Continued)

(52) U.S. Cl.
CPC .......... *F16K 31/002* (2013.01); *F01D 25/125* (2013.01); *F02C 7/18* (2013.01);
(Continued)

(58) Field of Classification Search
CPC ..... F03G 7/065; F02K 3/115; F05D 2300/505
See application file for complete search history.

(56) References Cited

U.S. PATENT DOCUMENTS

| 5,000,464 A | 3/1991 | Yasui |
| 5,746,170 A | 5/1998 | Moriya |

(Continued)

FOREIGN PATENT DOCUMENTS

| EP | 1916399 A2 | 4/2008 |
| EP | 2444703 A1 | 4/2012 |

(Continued)

OTHER PUBLICATIONS

PCT Search Report and Written Opinion issued in connection with corresponding Application No. PCT/US2014/056556 on Dec. 16, 2014.

(Continued)

*Primary Examiner* — Gregory Anderson
*Assistant Examiner* — Juan G Flores
(74) *Attorney, Agent, or Firm* — Nitin N. Joshi (57) ABSTRACT

An aviation bypass valve for use in a heat exchanger apparatus, including a shape memory alloy material. The heat exchanger apparatus further including an air-cooled oil cooler disposed in a bypass fan duct of an aircraft engine. The heat exchanger apparatus including a bypass valve in fluid communication with the air cooled oil cooler. The bypass valve including a valve body, a piston disposed in the valve body and moveable therein and an actuation component. The actuation component including a shape memory alloy. The actuation component responsive to a change in at least one of a thermal condition and a pressure exerted thereon so as to move the piston, thereby opening and closing the bypass valve.

14 Claims, 7 Drawing Sheets

(51) Int. Cl.
*F28F 27/02* (2006.01)
*F01D 25/12* (2006.01)
*F02K 3/115* (2006.01)
*F02C 7/18* (2006.01)

(52) U.S. Cl.
CPC .............. *F02K 3/115* (2013.01); *F03G 7/065* (2013.01); *F28F 27/02* (2013.01); *F05D 2260/606* (2013.01); *F05D 2300/505* (2013.01); *Y02T 50/671* (2013.01); *Y02T 50/675* (2013.01)

(56) References Cited

U.S. PATENT DOCUMENTS

| | | | |
|---|---|---|---|
| 6,485,255 B1 | 11/2002 | Care et al. | |
| 6,994,784 B2 * | 2/2006 | Jainek | B01D 35/147 123/196 A |
| 7,237,511 B2 | 7/2007 | Aoki et al. | |
| 8,016,952 B2 | 9/2011 | Ishida et al. | |
| 8,469,083 B2 | 6/2013 | Jainek et al. | |
| 2008/0095611 A1 * | 4/2008 | Storage | F01D 25/125 415/116 |
| 2010/0116465 A1 * | 5/2010 | Jainek | F01M 5/002 165/103 |
| 2010/0303616 A1 | 12/2010 | Chir et al. | |
| 2011/0121582 A1 | 5/2011 | Alexander et al. | |
| 2012/0090815 A1 * | 4/2012 | Cameron | F16K 31/002 165/67 |
| 2013/0055991 A1 | 9/2013 | Browne et al. | |

FOREIGN PATENT DOCUMENTS

| | | |
|---|---|---|
| JP | S6275084 A | 4/1987 |
| WO | 9612994 A1 | 5/1996 |
| WO | 2009025629 A1 | 2/2009 |

OTHER PUBLICATIONS

Stoeckel, et al "Use of Ni—Ti Shape Memory Alloys for Thermal Sensor-Actuators" SPIE Proceedings 1523, Active and Adaptive Optical Components, 382, San Diego, CA Jul. 1991.

* cited by examiner

AVIATION BYPASS VALVE INCLUDING A SHAPE MEMORY ALLOY MATERIAL

BACKGROUND

The present disclosure relates to shape memory alloys and it use, and more particularly to the use of a shape memory alloy in an air-cooled oil cooler system of an aviation engine.

Aviation engines use oil to dissipate heat from engine components, such as engine bearings, electrical generators, and the like. Heat is typically rejected from the oil to air by air cooled oil coolers (ACOC), and more particularly, surface air-cooled oil cooler (ACOC) systems to maintain oil temperatures at a desired ~100° F.<T<300° F. In many instances an environment may be as low as −65° F. When this occurs, a bypass valve may be incorporated to allow a portion of the oil to bypass the air cooled oil cooler and return to the engine without being cooled by the air cooled oil cooler, if required.

Known bypass valves for use in air-cooled oil cooler systems of aviation engines typically include pressure actuated valves that are responsive to an increase in pressure, and pressure and thermally actuated valves that are responsive to an increase in both pressure and temperature. Pressure actuated valves are well known in the art, but are not easily tunable. Pressure and thermally actuated valves are also known in the art and typically comprise a valve driven by dual springs and a thermal actuator based on the volume change of a wax contained therein that is subject to a change in phase from a solid to a liquid in response to an increase in temperature. Pressure and thermally actuated bypass valves, while providing a sufficient means for allowing a portion of the oil to return to the engine without being cooled, are unreliable due to sealing issues and the like. In this type of valve, the wax in liquid phase has a tendency to leak and therefore the reliability of the valve is typically lower than desired. In addition, the inclusion of dual springs results in a component of a weight and a cost that may be of issue.

It would therefore be desirable to provide a robust pressure and thermally actuated bypass valve for use in an air-cooled oil cooler system for an aviation engine that addresses the above issues.

BRIEF SUMMARY

These and other shortcomings of the prior art are addressed by the present disclosure, which provides a bypass valve.

In accordance with an embodiment, provided is a bypass valve comprising a valve body, a piston disposed in the valve body, and moveable therein; and an actuation component. The actuation component includes a shape memory alloy (SMA). The actuation component is responsive to a change in at least one of a thermal condition and a pressure exerted thereon so as to move the piston, thereby opening and closing the bypass valve.

In accordance with another embodiment, provided is a heat exchanger apparatus for use in an oil cooling system of an aircraft engine comprising: an air-cooled oil cooler disposed in a bypass fan duct of the aircraft engine; and a bypass valve, in fluid communication with the air-cooled oil cooler. The bypass valve comprising: a valve body; a piston disposed in the valve body, and moveable therein; and an actuation component. The actuation component includes a shape memory alloy (SMA). The actuation component is responsive to a change in at least one of a thermal condition and a pressure exerted thereon so as to move the piston, thereby opening and closing the bypass valve.

In accordance with yet another embodiment, provided is an engine including a core engine; and a heat exchanger apparatus comprising: an air-cooled oil cooler disposed in a bypass fan duct of an aircraft engine; and a bypass valve, in fluid communication with the air-cooled oil cooler. The bypass valve comprising: a valve body; a piston disposed in the valve body, and moveable therein; and an actuation component. The actuation component includes a shape memory alloy (SMA). The actuation component is responsive to a change in at least one of a thermal condition and a pressure exerted thereon so as to move the piston, thereby opening and closing the bypass valve.

Other objects and advantages of the present disclosure will become apparent upon reading the following detailed description and the appended claims with reference to the accompanying drawings.

BRIEF DESCRIPTION OF THE FIGURES

These and other features, aspects, and advantages of the present disclosure will become better understood when the following detailed description is read with reference to the accompanying drawings in which like characters represent like parts throughout the drawings, wherein.

DETAILED DESCRIPTION

The present disclosure will be described for the purposes of illustration only in connection with certain embodiments; however, it is to be understood that other objects and advantages of the present disclosure will be made apparent by the following description of the drawings according to the disclosure. While preferred embodiments are disclosed, they are not intended to be limiting. Rather, the general principles set forth herein are considered to be merely illustrative of the scope of the present disclosure and it is to be further understood that numerous changes may be made without straying from the scope of the present disclosure.

Preferred embodiments of the present disclosure are illustrated in the figures with like numerals being used to refer to like and corresponding parts of the various drawings. It is also understood that terms such as "top", "bottom", "outward", "inward", and the like are words of convenience and are not to be construed as limiting terms. It is to be noted that the terms "first," "second," and the like, as used herein do not denote any order, quantity, or importance, but rather are used to distinguish one element from another. The terms "a" and "an" do not denote a limitation of quantity, but rather denote the presence of at least one of the referenced item. The modifier "about" used in connection with a quantity is inclusive of the stated value and has the meaning dictated by the context (e.g., includes the degree of error associated with measurement of the particular quantity).

Embodiments disclosed herein relate to a bypass valve for use in an oil cooling system of an aircraft engine comprised of an actuation component formed of a shape memory alloy. In contrast to known valves of this type, the disclosed novel valve includes no wax, and therefore does not have any problems associated with leakage of the wax. In addition, the disclosed novel actuation component minimizes the weight and cost of the overall valve. Accordingly, disclosed is the inclusion of a shape memory alloy in a by-pass valve of an air-cooled oil cooler for an aviation engine.

The actuation component introduces a novel concept for passively controlling the bypass valve of an oil cooling system in an aviation engine, such as an aircraft engine, but the valve could be used also in a land based gas turbine. The disclosed valve, heat exchanger apparatus and method are additionally anticipated for use in any cooling system within aviation or land based engine (e.g. the cooling oil for the electrical generator of an aircraft engine or the lubrication oil of the aircraft engine). The bypass valve is responsive to a change in oil temperature and oil pressure in the oil system during normal operating conditions. More specifically, a change in oil temperature and oil pressure will drive the position of the bypass valve as required by the oil circuit cooling operating concept. It is anticipated by this disclosure that the disclosed SMA bypass valve may also be applied to any other cooling fluid system (e.g. fuel cooled, hydraulic fluid or water systems), and not limited to the example oil cooled system described herein.

Figure 1:
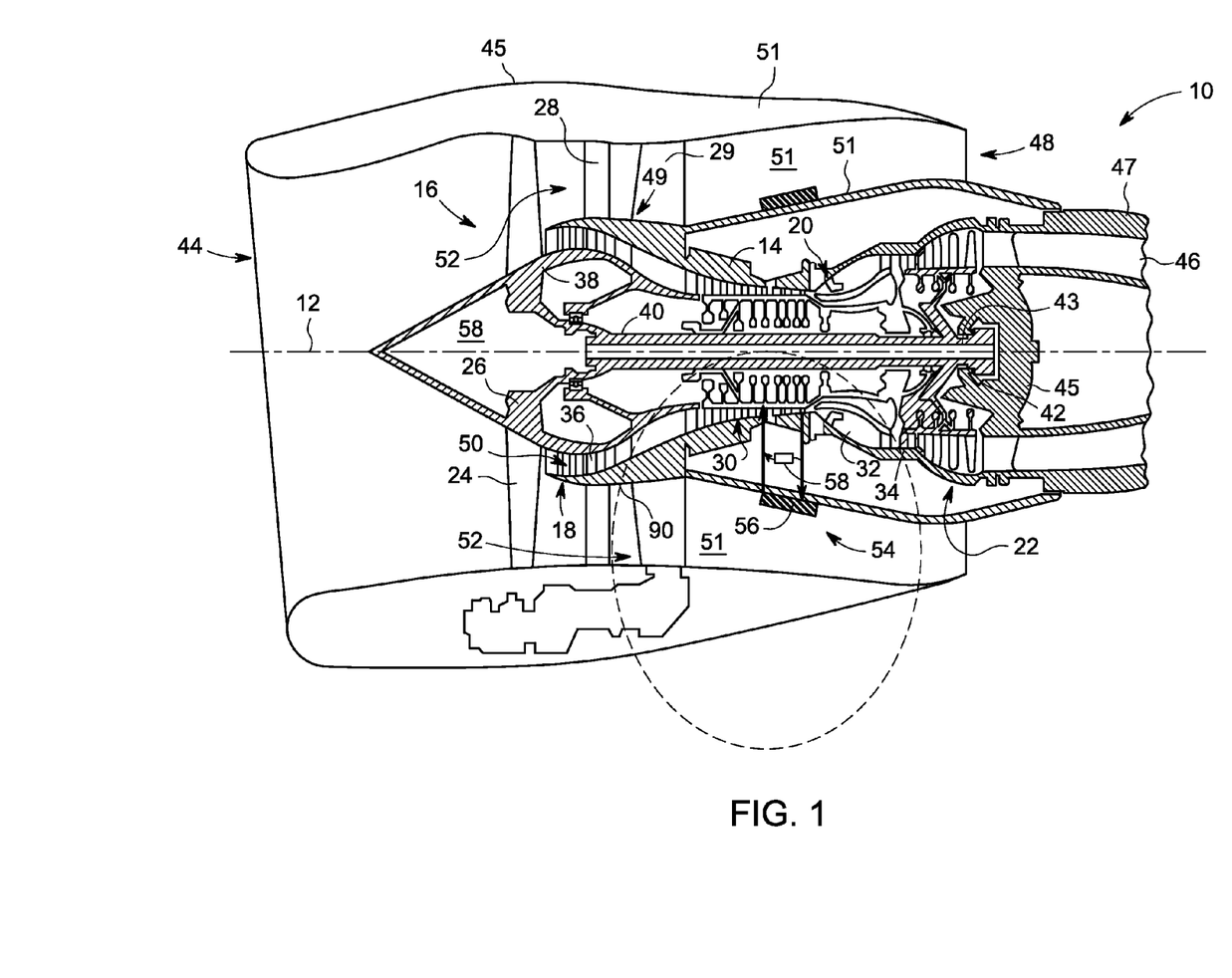
FIG. 1 is a schematic longitudinal cross-section of portion of an aircraft engine including an ACOC and a bypass valve, in accordance with one or more embodiments shown or described herein.
Figure 2:
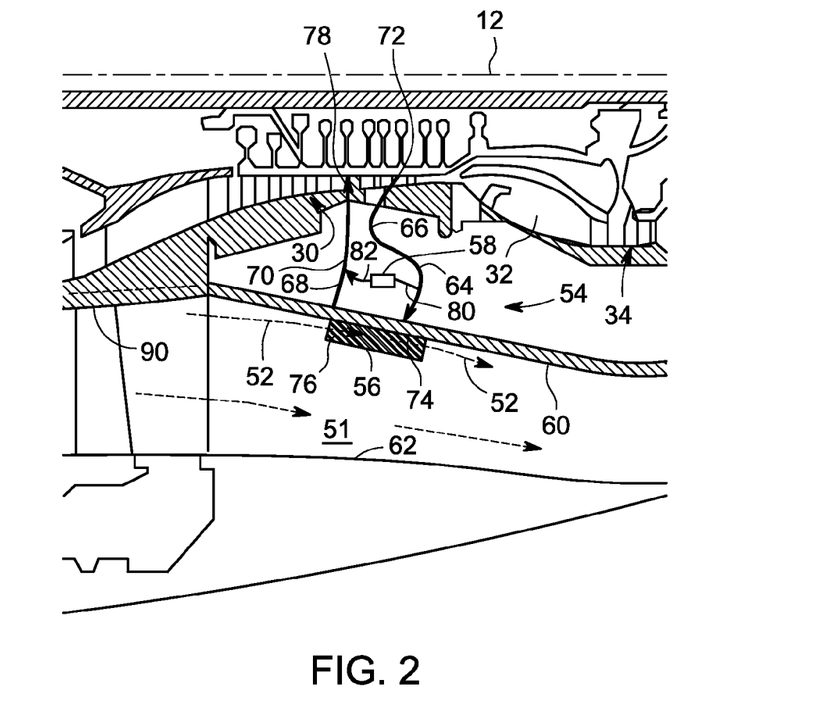
FIG. 2 is a schematic longitudinal cross-section of portion of the aircraft engine of FIG. 1, including the ACOC and the bypass valve, in accordance with one or more embodiments shown or described herein.

Referring to the drawings wherein identical reference numerals denote the same elements throughout the various views, FIGS. 1 and 2 depict a schematic illustration of an exemplary aircraft engine assembly 10. It is noted that the portion of the engine assembly 10, illustrated in FIG. 2, is indicated by dotted line in FIG. 1. The engine assembly 10 has a longitudinal center line or axis 12 and an outer stationary annular casing 14 disposed concentrically about and coaxially along the axis 12. In the exemplary embodiment, the engine assembly 10 includes a fan assembly 16, a booster compressor 18, a core gas turbine engine 20, and a low-pressure turbine 22 that may be coupled to the fan assembly 16 and the booster compressor 18. The fan assembly 16 includes a plurality of rotor fan blades 24 that extend substantially radially outward from a fan rotor disk 26, as well as a plurality of structural strut members 28 and outlet guide vanes ("OGVs") 29 that may be positioned downstream of the rotor fan blades 24. In this example, separate members are provided for the aerodynamic and structural functions. In other configurations, each of the OGVs 29 may be both an aerodynamic element and a structural support for an annular fan casing (described presently). While the concepts of the present disclosure will be described including a bypass valve as an example of a portion of a heat exchanger apparatus, it will be understood that those concepts are applicable to any aero-turning or stationary airfoil-type structure within the engine assembly 10.

The core gas turbine engine 20 includes a high-pressure compressor 30, a combustor 32, and a high-pressure turbine 34. The booster compressor 18 includes a plurality of rotor blades 36 that extend substantially radially outward from a compressor rotor disk 38 coupled to a first drive shaft 40. The high-pressure compressor 30 and the high-pressure turbine 34 are coupled together by a second drive shaft 42. The first and second drive shafts 40 and 42 are rotatably mounted in bearings 43 which are themselves mounted in a fan frame 45 and a turbine rear frame 47. The engine assembly 10 also includes an intake side 44, a core engine exhaust side 46, and a fan exhaust side 48.

During operation, the fan assembly 14 compresses air entering the engine assembly 10 through the intake side 44. The airflow exiting the fan assembly 14 is split such that a portion 50 of the airflow is channeled into the booster compressor 18, as compressed airflow, and a remaining portion 52 of the airflow bypasses the booster compressor 18 and the core gas turbine engine 20 and exits the engine assembly 10 via a fan duct 51, through the fan exhaust side 48 as bypass air. This portion 52 of the airflow, also referred to herein as bypass air flow 52, flows past and interacts with the structural strut members 28, the outlet guide vanes 29 and a heat exchanger apparatus (described presently). The plurality of rotor blades 24 compress and deliver the compressed airflow 50 towards the core gas turbine engine 20. Furthermore, the airflow 50 is further compressed by the high-pressure compressor 30 and is delivered to the combustor 32. Moreover, the compressed airflow 50 from the combustor 32 drives the rotating high-pressure turbine 34 and the low-pressure turbine 22 and exits the engine assembly 10 through the core engine exhaust side 46.

As previously noted, in certain presently available commercial engines heat exchanger apparatus are employed including a surface oil cooler or a generic air cooled oil cooler and a bypass valve for the purpose of allowing a portion of the oil to bypass the air cooled oil cooler and return to the engine without being cooled by the air cooled oil cooler. In accordance with exemplary aspects of the present technique, a heat exchanger apparatus 54 including an air cooled oil cooler 56 configured to function as a heat exchanger, and an air-cooled oil cooler (ACOC) bypass valve 58, is presented. More particularly, the exemplary apparatus 54 may be configured to address the heat exchange requirements of a turbomachine such as an aircraft engine, for example. Hereinafter, the term "heat exchanger"

may be used to refer to the apparatus 54 configured to facilitate cooling of the turbomachine. The concept is also applicable to any type of aircraft engine (e.g. piston, electric, etc.)

Figure 3:
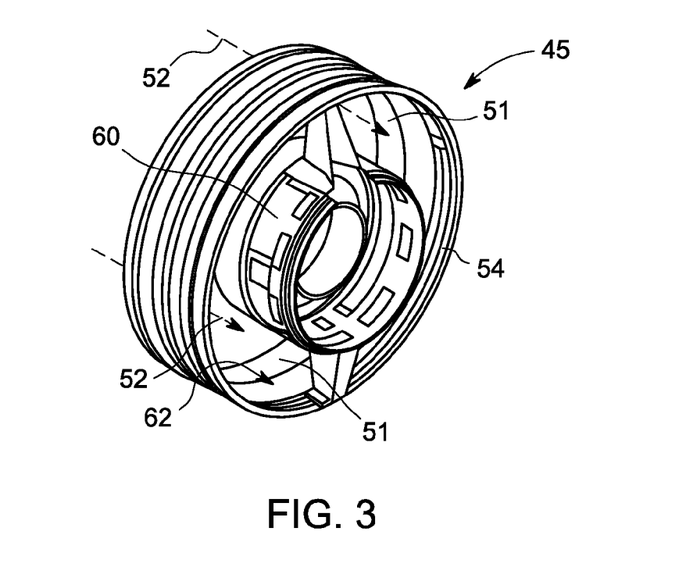
FIG. 3 is a schematic isometric view of an embodiment of a fan frame including an ACOC and a bypass valve, in accordance with one or more embodiments shown or described herein.

Referring more specifically to FIG. 2, illustrated is a schematic longitudinal cross-section of portion of the aircraft engine of FIG. 1, including the heat exchanger apparatus 54 and the ACOC bypass valve 58 in greater detail. As illustrated, in the embodiment of FIGS. 1 and 2, the air cooled oil cooler 56 is mounted to an interior surface 60, relative to axis 12, of the volume 45 that defines the fan duct 51. In an alternate embodiment, as best illustrated in FIG. 3 and described presently, the air cooled oil cooler 56 may be mounted to an exterior surface 62 (FIG. 3), relative to the axis 12, of the volume 45 that defines the fan duct 51. During operation, the portion 52 of the bypass airflow, flows past and interacts with the heat exchanger apparatus 54, and more particularly the air cooled oil cooler 56. During operation, hot engine oil 64 is directed to the heat exchanger apparatus 54 and more specifically, the air cooled oil cooler 56 via a hot oil passage 66 and cooled engine oil 68 is directed back to the engine 10 via a cooled oil passage 70. In an embodiment, the hot oil passage 66 is connected on one side to an oil outlet 72 of an engine block, or the like, and on the other side to an oil inlet 74 of the air cooled oil cooler 56. In addition, the cooled oil passage 70 is connected on one side to an oil outlet 76 of the air cooled oil cooler 56 and on the other side to an oil inlet 78 of the engine block, or the like. A bypass passage 80 connects the hot oil passage 66 to the cooled oil passage 70. As previously indicated, during operation, heat is rejected from the hot engine oil 64 to air by the air cooled oil cooler 56 to maintain oil temperatures at a desired ~$100°$ F.<T<$300°$ F. In the presence of a colder environment, or otherwise when the dissipation of heat from the hot engine oil 64 is not required, the ACOC bypass valve 58 allows at least a portion 82 of the hot engine oil 64 to bypass the cooler 56 and return to the engine without being cooled by the air cooled oil cooler 56. In this particular embodiment, the ACOC bypass valve 58 is positioned separate from the air cooled oil cooler 56.

Figure 4:
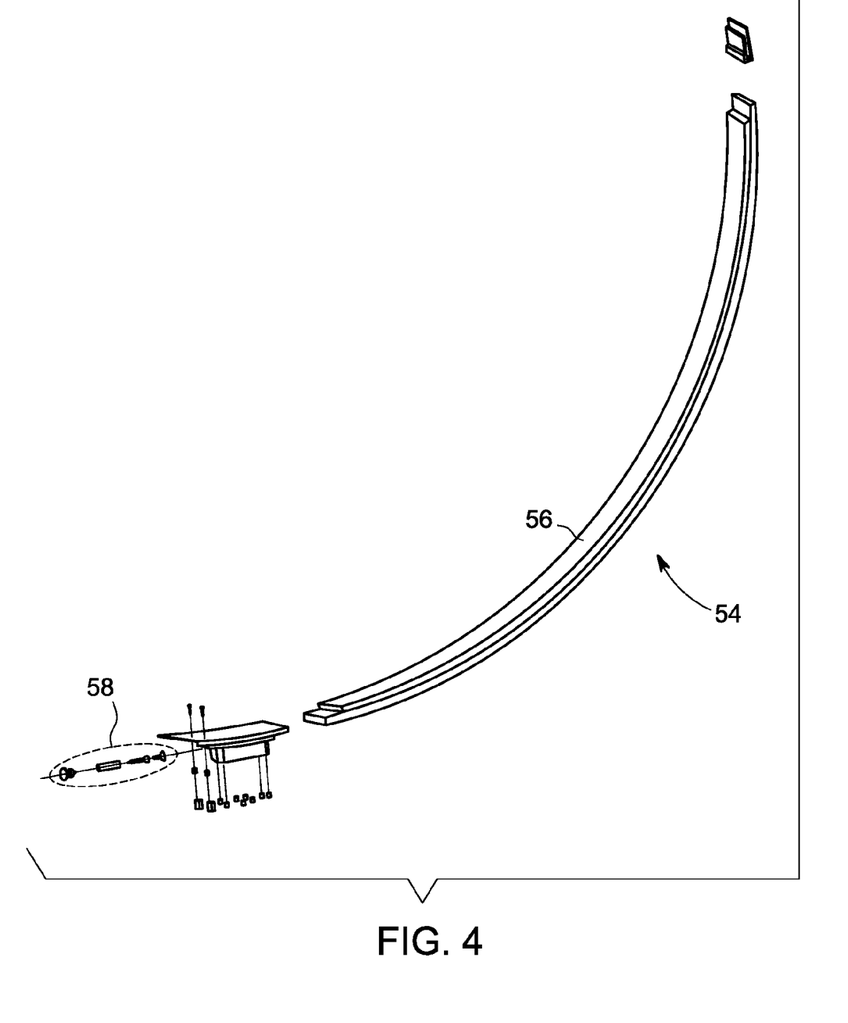
FIG. 4 is an exploded schematic isometric view of a portion of the surface cooler and the ACOC bypass valve of FIG. 3, in accordance with one or more embodiments shown or described herein.

Referring now to FIGS. 3 and 4, illustrated in FIG. 3 is a schematic isometric view of an alternate embodiment in which the heat exchanger apparatus 54 is configured including the air cooled oil cooler 56 and the ACOC bypass valve 58 as integrally formed. In addition, as illustrated in this particular embodiment, the heat exchanger apparatus 54 is disposed on the exterior surface 62 of the fan frame 45 that defines the fan duct 51. FIG. 4 is an exploded enlarged schematic isometric view of a portion of the heat exchanger apparatus 54 of FIG. 3, including the air cooled oil cooler 56 and the integrally formed ACOC bypass valve 58. It should be understood that the positioning of the heat exchanger apparatus 54, and its included components disposed relative to one another, as described in relation to one or more of the illustrated embodiments may be incorporated into any of the described aspects of the present disclosure alone or in any combination.

The ACOC bypass valve 58 as previously indicated includes a shape memory alloy, and more particularly an actuation component formed of a shape memory alloy. Shape memory alloys are based on a change of mechanical properties of a material during the reversible transformation of two allotropic phases (e.g. martensite phase to austenite phase in a NiTi alloy). Shape memory alloys have been used in the automotive industry, but have not been disclosed for use in a main oil cooling or electrical generator cooling oil systems. In addition, it is not known to use shape memory alloys in cooling oil systems in aviation engines, such as aircraft engine assembly 10 described herein. Shape memory alloys (SMAs) provide for restoration of an original shape of deformed material by heat.

Figure 5:
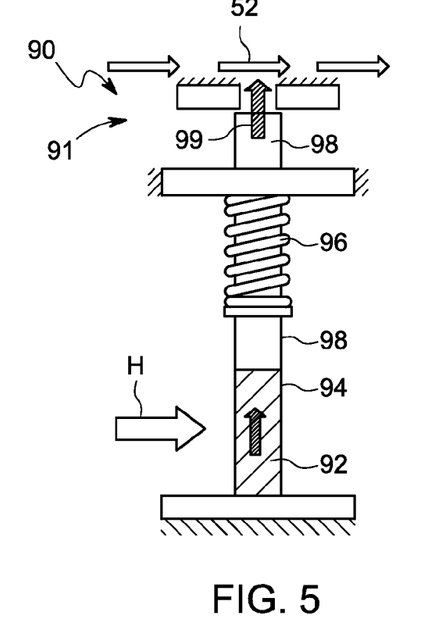
FIG. 5 is a schematic cross-section illustrating an ACOC bypass valve employing a shape memory alloy material during a first state of operation and thermal response, in accordance with one or more embodiments shown or described herein.
Figure 6:
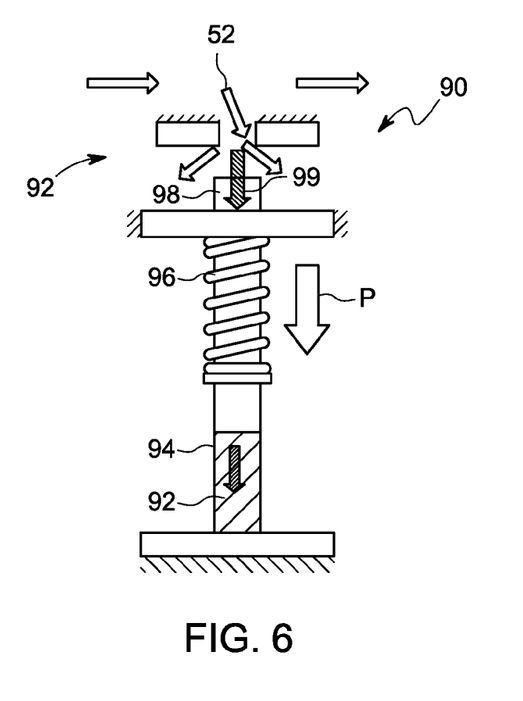
FIG. 6 is a schematic cross-section illustrating the ACOC bypass valve of FIG. 5, employing the shape memory alloy material during a second state of operation and thermal response, in accordance with one or more embodiments shown or described herein.

FIG. 5 is a schematic cross-section illustrating an ACOC bypass valve 90, similar to the ACOC bypass valve 58 of FIGS. 1-4, employing a shape memory alloy material during a first state of operation and thermal response. FIG. 6 is a schematic cross-section illustrating the surface cooler ACOC bypass valve 90 of FIG. 5, employing the shape memory alloy material during a second state of operation and thermal response. In the embodiment illustrated in FIGS. 5 and 6, the ACOC bypass valve 90 includes an actuation component 92 formed of a shape memory alloy.

In the illustrated embodiment, the actuation component 92 is configured as a linear SMA component 94 that extends or retracts according to the pre-memorized shape in parallel to the temperature change, and provides for the opening or closing of the ACOC bypass valve 90.

The ACOC bypass valve 90 provides for flow control of the hot engine oil 64 (FIG. 2) passing therethrough. The ACOC bypass valve 90, as illustrated, further includes components, such as a spring 96 and a piston 98, or other mechanism, that allows for linear movement, as indicated by directional arrows 99, so as to control the flow of oil through the ACOC bypass valve 90. As best illustrated in FIG. 5, when the surrounding environment is of a predetermined temperature the SMA component 94 is in its memorized shape, exerting a force upon the piston 98 and whereby the spring 96 is compressed with the linear movement of the piston 98 in a direction indicated by arrows 100. This movement of the piston 98 closes the ACOC bypass valve 90 to a closed position 91 so as to direct the hot engine oil 64 through the surface cooler 56 (FIG. 2), providing cooling to the hot engine oil 64. As best illustrated in FIG. 6, when the surrounding environment is of a predetermined cooler temperature so as to not require cooling of the hot engine oil 64, the SMA component 94 is deformable as a result of the fluid pressure exerted on the piston 98 in a direction indicated by arrows 99. This movement of the piston 98 opens the ACOC bypass valve 90 to an open position 93 so as to direct the hot engine oil 64 through the ACOC bypass valve 90 and thereby bypassing the cooling of the surface cooler 56. (FIG. 2).

Figure 7:
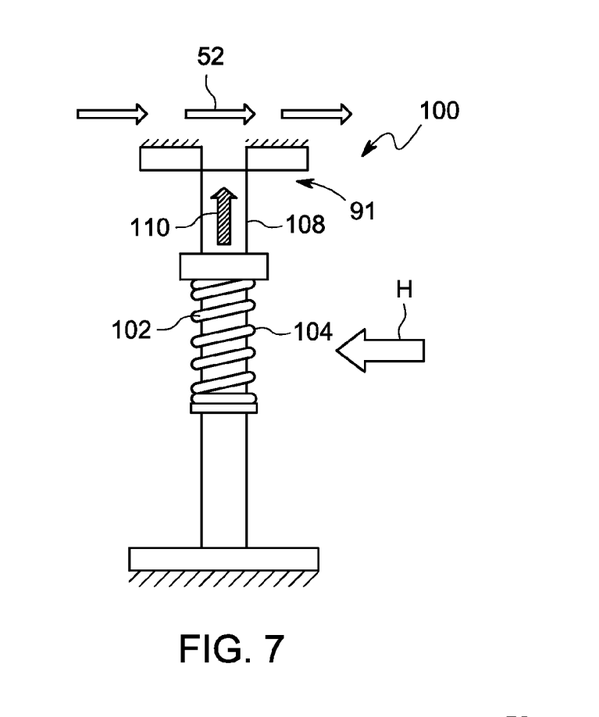
FIG. 7 is a schematic cross-section illustrating another embodiment of an ACOC bypass valve employing a shape memory alloy material during a first state of operation and thermal response, in accordance with one or more embodiments shown or described herein.
Figure 8:
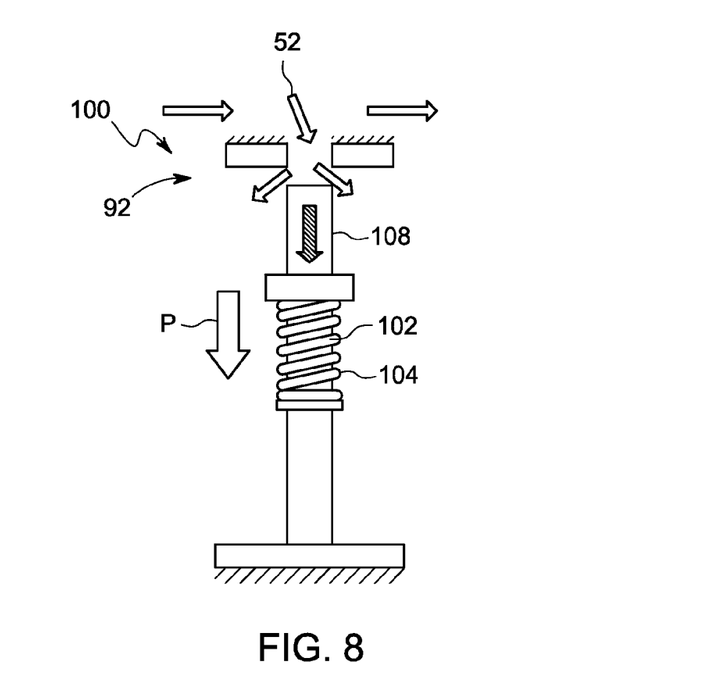
FIG. 8 is a schematic cross-section illustrating the ACOC bypass valve of FIG. 7, employing the shape memory alloy material during a second state of operation and thermal response, in accordance with one or more embodiments shown or described herein.

FIG. 7 is a schematic cross-section illustrating another embodiment of a surface cooler ACOC bypass valve 100, similar to the ACOC bypass valve 58 of FIGS. 1-4, employing a shape memory alloy material during a first state of operation and thermal response. FIG. 8 is a schematic cross-section illustrating the surface cooler ACOC bypass valve 100 of FIG. 7, employing the shape memory alloy material during a second state of operation and thermal response. In the embodiment illustrated in FIGS. 7 and 8, the ACOC bypass valve 100 includes an actuation component 102 formed of a shape memory alloy.

In the illustrated embodiment, the actuation component 102 is configured as a SMA spring 104 that extends or retracts according to the pre-memorized shape in parallel to the temperature change, and provides for the opening or closing of the ACOC bypass valve 100.

The ACOC bypass valve 100 provides for flow control of the hot engine oil 64 (FIG. 2) passing therethrough. The ACOC bypass valve 100, as illustrated, further includes components, such as a piston 108, or other mechanism, that allows for linear movement, as indicated by directional arrows 110, so as to control the flow of oil through the ACOC bypass valve 100. As best illustrated in FIG. 7, when the surrounding environment is of a predetermined temperature the SMA spring 104 returns to its memorized extended shape, exerting a linear force upon the piston 98 and resulting in the linear movement of the piston 108 in a direction indicated by arrows 110. This movement of the piston 108 closes the ACOC bypass valve 100 to a closed position 91 so as to direct the hot engine oil 64 through the surface cooler 56 (FIG. 2), providing cooling to the hot engine oil 64. As best illustrated in FIG. 8, when the surrounding environment is of a predetermined cooler temperature so as to not require cooling of the hot engine oil 64, the SMA spring 104 is deformable as a result of the fluid pressure exerted on the piston 108 in a direction indicated by arrows 110. This movement of the piston 108 opens the ACOC bypass valve 100 to an open position 93 so as to direct the hot engine oil 64 therethrough the ACOC bypass valve 100 and thereby bypassing the cooling of the surface cooler 56. (FIG. 2).

In an embodiment, the shape memory alloy material is comprised of a nickel-titanium alloy that incurs a memorized shape change within a requested temperature range, although it should be understood that any alloy of metal having the memory effect is suitable for use. The change in shape of the actuation component 92, 102 comprised of the shape memory alloy, as described herein, provides for opening or closing of the flow of hot engine oil 60 within the ACOC bypass valve 90, 100.

Figure 9A:
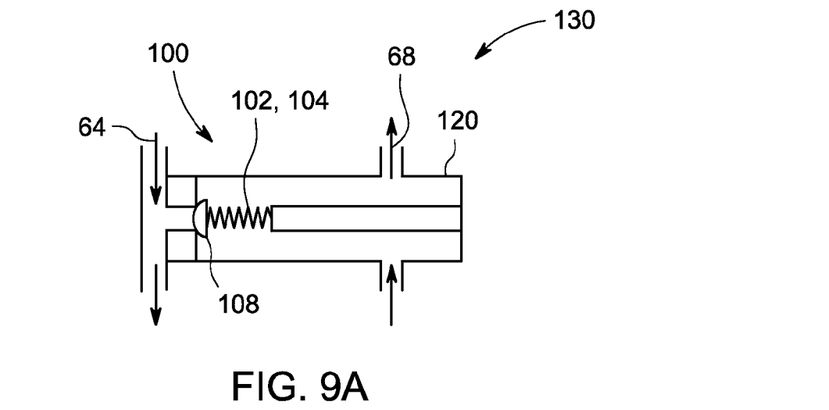
FIGS. 9A-9C illustrate steps in a method of operating an ACOC bypass valve including a shape memory alloy, in accordance with one or more embodiments shown or described herein.
Figure 9B:
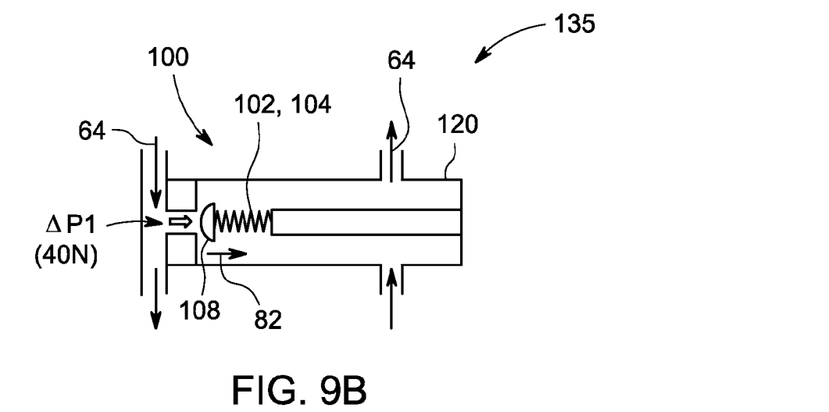
Figure 9C:
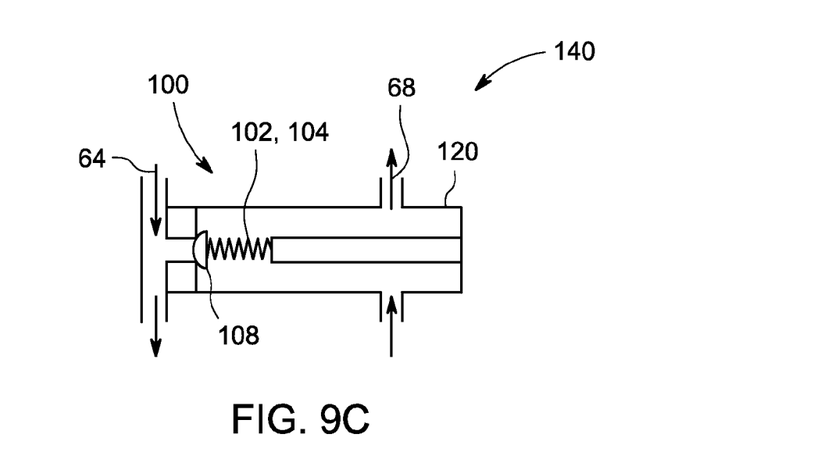

FIGS. 9A-9C illustrates steps in a method of operating an ACOC bypass valve, such as bypass valve 100 of FIGS. 7 and 8, including a shape memory alloy. As illustrated, a change in temperature will effect a change in the mechanical properties of the included actuation component 102 formed of a shape memory alloy. The actuation component 102 controls the position of the piston 108 disposed within a valve body 120, and therefore provides different cracking pressures for the opening of the ACOC bypass valve 100. In the illustrated steps, initially, as best illustrated in FIG. 9A, at a step 130, the ACOC bypass valve 100 is in a closed position, similar to that illustrated in FIG. 7. As illustrated, the actuation component 102, and more particularly the SMA spring 104, is under the influence of a heated environment and is in a fully extended memorized shape, so as to linearly position the piston 108 disposed within the valve body 120 to close the ACOC bypass valve 100. The ACOC bypass valve 100 when positioned as such provides for directing of the hot engine oil 64 from the oil outlet of the engine 72 (FIG. 2) toward the surface cooler 56 (FIG. 2) for cooling and the cooled engine oil 68 is directed from an oil outlet of the surface cooler 76 (FIG. 2) toward the engine 10.

As illustrated in FIG. 9B, next, at a step 135, when operating conditions are sufficiently cool to negate the need to cool the hot engine oil 64, the hot engine oil 64 is directed from the oil outlet of the engine 72 (FIG. 2) toward the oil inlet of the surface cooler 74 (FIG. 3), the pressure increases so as to deform the SMA spring 104 to a contracted position, resulting in linear movement of the piston 108 disposed within the valve body 120 and opening of the ACOC bypass valve 100. At least a portion 82 of the hot engine oil 64 is directed through the ACOC bypass valve 100, bypassing the surface cooler 56 (FIG. 2). Upon heating of the actuation component 102, and more particularly the SMA spring 104, as a result of the hot engine oil 64 impinging thereon, the SMA will return to its memorized original position, such as that shown in FIG. 9C, at a step 140, thereby closing the ACOC bypass valve 100 and directing the hot engine oil 64 toward the surface cooler 56.

Figure 10:
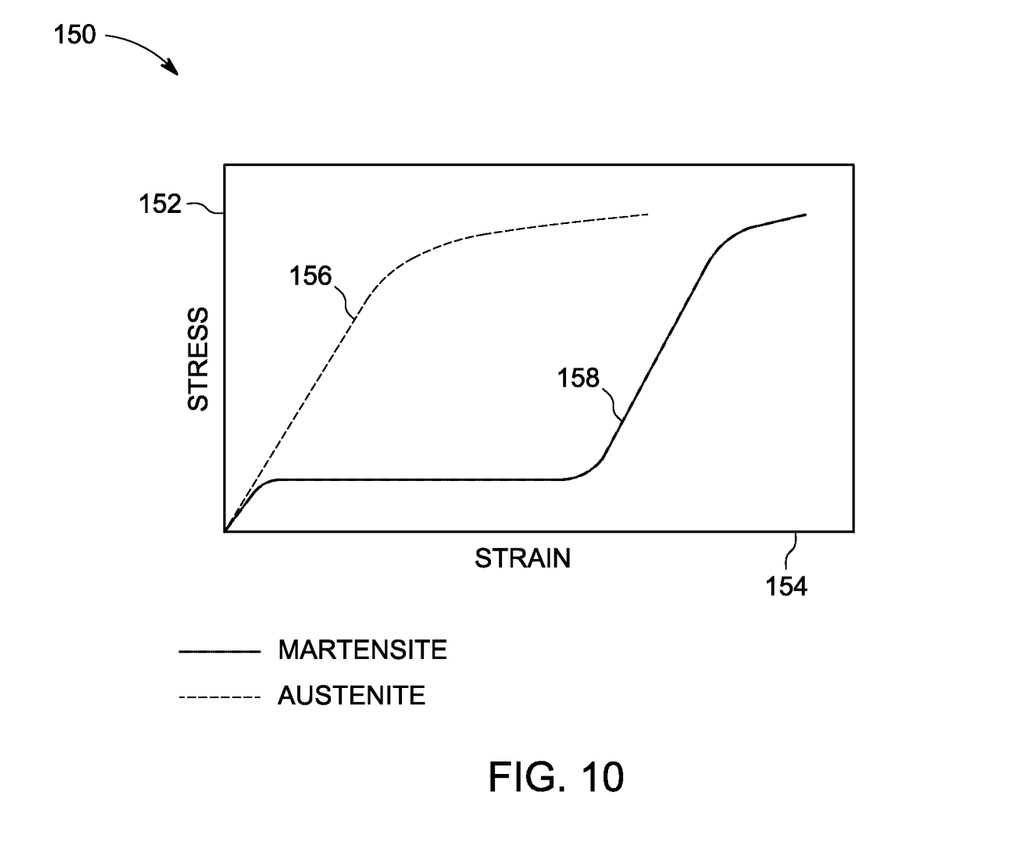
FIG. 10 is a graphical plot of stress as a function of strain of a shape memory alloy for the particular martensite phase and austenite phase, in accordance with one or more embodiments shown or described herein.

As previously mentioned, shape memory alloys are based on the change of mechanical properties of a material during the reversible transformation of two allotropic phases (e.g. martensite phase to austenite phase in a NiTi alloy). FIG. 10 shows a plot 150 of calculated stress 152 (Y-axis) as a function of strain 154 (X-axis) with an increase in temperature of a well know shape alloy material intended for use in the ACOC bypass valve 58, 90, 100 disclosed herein. More specifically, illustrated is the calculated stress as a function of strain during the martensite phase and the austenite phase of the shape memory alloy Line 158 shows the values during the martensite phase and line 156 shows the values during the austenite phase. As seen clearly from plot 150, the stress/strain curve will depend on the temperature of the SMA.

As previously mentioned, the change in phase of a shape memory alloy occurs as a result of a change in temperature. More specifically, in the martensitic phase, the shape memory alloy is soft and easily deformable, such as when the SMA spring 104 of FIGS. 7 and 8 is compressed so as to provide linear movement of the piston 94 in response to operation in a cooled environment. This movement in light of the deformability of the shape memory alloy in the martensitic phase provides for opening of the ACOC bypass valve 100, as illustrated in FIGS. 7 and 9B. With an increase in temperature, the shape memory alloy enters the austenitic phase, returning the SMA spring 104 back to its predetermined shape, exhibiting high strength characteristics and closing of the ACOC bypass valve 100, as illustrated in FIGS. 8, 9A and 9B. The transition between these phases is a diffusionless transformation and thus requires very little thermal activation energy.

The disclosed novel bypass valve and method of using a shape memory alloy in the bypass valve combines the physical properties of the shape memory alloy material to create an actuation component that changes the stroke in response to changes in the temperature and pressure. The temperature change is created by the boundary conditions of the actuation component (e.g. if it is immersed in a fluid that changes temperature with time) and therefore provides a closed loop control from temperature or pressure of the fluid or environment.

Accordingly disclosed is an ACOC bypass valve including a shape memory alloy, an engine including an ACOC bypass valve and a method of operating an ACOC bypass valve including a shape memory alloy. This disclosed concept has several advantages. Among them, the novel valve is inexpensive to manufacture, weighs less than prior art by-pass valves, is reliable, and does not require an external source of energy in passive mode. In addition, in that the valve does not require the use of a wax, there does not exist any issues with leakage or sealing of components.

The foregoing has described a heat exchanger apparatus comprising an ACOC bypass valve including a shape memory alloy for a gas turbine engine and a method for its operation. While the present disclosure has been described with respect to a limited number of embodiments, those skilled in the art, having benefit of this disclosure, will appreciate that other embodiments may be devised which do not depart from the scope of the disclosure as described herein. While the present disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the present disclosure without departing from the essential scope thereof. For example, the ACOC bypass valve described herein may be configured for use in many different types of aircraft engine architectures, in addition to the example engine describe herein, such as, but not limited to a multi-spool design (additional compressor and turbine section), a geared turbo fan type architecture, engines including un-ducted fans, single shaft engine designs (single compressor and turbine sections), or the like. In addition, the ACOC bypass valve disclosed herein will work equally well with other types of air-cooled oil coolers, and as such is not intended to be limited to surface coolers, and may be configured for use in other ACOC types, such as plate and fin, tube-fin type ACOC's, or the like would benefit as well. Therefore, it is intended that the present disclosure not be limited to the particular embodiment disclosed as the best mode contemplated for carrying out the disclosure. It is, therefore, to be understood that the appended claims are intended to cover all such modifications and changes as fall within the true spirit of the disclosure.

What is claimed is:

1. A bypass valve comprising:
a valve body;
a piston disposed in the valve body, and moveable therein to open and close the valve; and
an actuation component, wherein the actuation component is at least one of a shape memory alloy (SMA) spring or a linear SMA component, the actuation component responsive to a change in at least one of a thermal condition and a pressure exerted thereon so as to move the piston, thereby opening and closing the bypass valve, and wherein the actuation component is in direct fluid communication with a fluid having a flow velocity when the bypass valve is in a closed position.

2. The bypass valve of claim 1, wherein the actuation component is configured to move the piston to a closed position in response to a predetermined temperature exerted thereon.

3. The bypass valve of claim 2, wherein the actuation component is configured to move the piston to an open position in response to a predetermined temperature exerted thereon.

4. The bypass valve of claim 1, wherein the actuation component is a linearly configured shape memory alloy component and a single shape memory alloy spring.

5. The bypass valve of claim 1, wherein the bypass valve is configured for use in an aerospace application.

6. The bypass valve of claim 1, wherein the bypass valve is configured for use in an oil cooling system of an aircraft engine.

7. The bypass valve of claim 1, wherein the bypass valve is configured to provide a bypass for at least a portion of a hot engine oil from an engine directed toward a surface cooler and direct it back to the engine prior to reaching the surface cooler.

8. A heat exchanger apparatus for use in an oil cooling system of an aircraft engine comprising:
an air-cooled oil cooler disposed in a bypass fan duct of the aircraft engine; and
a bypass valve, in fluid communication with the air-cooled oil cooler, the bypass valve comprising:
a valve body;
a piston disposed in the valve body, and moveable therein to open and close the valve; and
an actuation component, wherein the actuation component is at least one of a shape memory alloy (SMA) spring or a linear SMA component, the actuation component responsive to a change in at least one of a thermal condition and a pressure exerted thereon so as to move the piston, thereby opening and closing the bypass valve, and wherein the actuation component is in direct fluid communication with a fluid having a flow velocity when the bypass valve is in a closed position.

9. The heat exchanger apparatus of claim 8, wherein the actuation component is configured to move the piston to a closed position in response to a predetermined temperature exerted thereon and to an open position in response to a predetermined temperature exerted thereon.

10. The heat exchanger apparatus of claim 8, wherein the shape memory alloy is comprised of a nickel-titanium alloy.

11. The heat exchanger apparatus of claim 8, wherein the heat exchanger apparatus is configured for use in an oil cooling system of an aircraft engine.

12. The heat exchanger apparatus of claim 8, wherein the bypass valve is configured to provide a bypass for at least a portion of a hot engine oil directed toward the air-cooled oil cooler and direct it back to the engine prior to reaching the air-cooled oil cooler.

13. An engine comprising:
a core engine; and
a heat exchanger apparatus comprising:
an air-cooled oil cooler disposed in a bypass fan duct of an aircraft engine; and
a bypass valve, in fluid communication with the air-cooled oil cooler, the bypass valve comprising:
a valve body;
a piston disposed in the valve body, and moveable therein to open and close the valve; and
an actuation component, wherein the actuation component is at least one of a single shape memory alloy (SMA) spring or a linear SMA component, the actuation component responsive to a change in at least one of a thermal condition and a pressure exerted thereon so as to move the piston, thereby opening and closing the bypass valve, and wherein the actuation component is in direct fluid communication with a fluid having a flow velocity when the bypass valve is in a closed position.

14. The engine of claim 13, wherein the bypass valve is configured for use in an oil cooling system of an aircraft engine.

* * * * *